United States Patent
Ramani et al.

(10) Patent No.: US 11,810,259 B2
(45) Date of Patent: *Nov. 7, 2023

(54) SYSTEM AND METHOD FOR GENERATING ASYNCHRONOUS AUGMENTED REALITY INSTRUCTIONS

(71) Applicant: Purdue Research Foundation, West Lafayette, IN (US)

(72) Inventors: Karthik Ramani, West Lafayette, IN (US); Subramaniam Chidambaram, West Lafayette, IN (US); Hank Huang, West Lafayette, IN (US); Fengming He, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,767

(22) Filed: Jul. 5, 2022

(65) Prior Publication Data
US 2022/0414992 A1 Dec. 29, 2022

Related U.S. Application Data

(63) Continuation of application No. 17/085,620, filed on Oct. 30, 2020, now Pat. No. 11,380,069.
(Continued)

(51) Int. Cl.
*G06T 19/00* (2011.01)
*G02B 27/01* (2006.01)
*G06T 7/246* (2017.01)

(52) U.S. Cl.
CPC ........ *G06T 19/006* (2013.01); *G02B 27/0172* (2013.01); *G06T 7/251* (2017.01); *G06T 19/003* (2013.01); *G02B 2027/0138* (2013.01)

(58) Field of Classification Search
None
See application file for complete search history.

(56) References Cited

U.S. PATENT DOCUMENTS 8,914,472 B1 * 12/2014 Lee .................. G06Q 30/04
  709/219
10,431,108 B2 * 10/2019 Chestnut .............. G09B 5/00
(Continued)

OTHER PUBLICATIONS

Joseph Redmon and Ali Farhadi. 2018. Yolov3: An incremental improvement. arXiv preprint arXiv:1804.02767 (2018).
(Continued)

*Primary Examiner* — Ryan M Gray
(74) *Attorney, Agent, or Firm* — Maginot, Moore & Beck LLP

(57) ABSTRACT

A method of operating an augmented reality (AR) system includes capturing images of a first real-world workspace using a camera of a first head mounted AR device of the AR system being worn by a first user, processing the images using a first processor of the AR system to identify physical objects in the first real-world workspace and detect 3D positions of the identified physical objects in a 3D space corresponding to the first real-world workspace, rendering virtual objects representing the identified physical objects on the display of the first head mounted AR device at the respective 3D positions for the identified physical objects, manipulating a first one of the virtual objects using at least one hand-held controller of the AR system in a manner that mimics a performance of a first procedural task using the physical object associated with the first one of the virtual objects, recording the manipulation of the first one of the virtual objects that mimics the performance of the first procedural task as first augmented reality content, and storing the first augmented reality content in a memory of the AR system.

20 Claims, 12 Drawing Sheets

Related U.S. Application Data

(60) Provisional application No. 63/046,241, filed on Jun. 30, 2020, provisional application No. 62/927,685, filed on Oct. 30, 2019.

(56) References Cited

U.S. PATENT DOCUMENTS

| | | | |
|---|---|---|---|
| 11,380,069 B2* | 7/2022 | Ramani | G06T 19/006 |
| 2016/0358383 A1* | 12/2016 | Gauglitz | G06F 3/0304 |
| 2021/0174701 A1* | 6/2021 | Lindstrom | G06T 19/006 |

OTHER PUBLICATIONS

Dirk Reiners, Didier Stricker, Gudrun Klinker, and Stefan Müller. 1999. Augmented reality for construction tasks: Doorlock assembly. In Proceedings of the international workshop on Augmented reality: placing artificial objects in real scenes: placing artificial objectsin real scenes. AK Peters, Ltd., 31-46.

Nazmus Saquib, Rubaiat Habib Kazi, Li-Yi Wei, and Wilmot Li. 2019. Interactive Body-Driven Graphics for Augmented Video Performance. In Proceedings of the 2019 CHI Conference on Human Factors in Computing Systems. ACM, 622.

Eldon Schoop, Michelle Nguyen, Daniel Lim, Valkyrie Savage, Sean Follmer, and Björn Hartmann. 2016. Drill Sergeant: Supporting physical construction projects through an ecosystem of augmented tools. In Proceedings of the 2016 CHI Conference Extended Abstracts on Human Factors in Computing Systems. ACM, 1607-1614.

Rajeev Sharma and Jose Molineros. 1997. Computer vision-based augmented reality for guiding manual assembly. Presence: Teleoperators & Virtual Environments 6, 3 (1997), 292-317.

Autodesk Sketchbook. 2019. Autodesk Sketchbook. (2019). Retrieved Sep. 18, 2019, from https://sketchbook.com.

Enox Software. 2019. OpenCV for Unity. (2019). Retrieved Sep. 18, 2019, from https://enoxsoftware.com/opencvforunity.

Stereolabs. 2019. Stereolabs ZED—Unity Plugin. (2019). Retrieved Sep. 18, 2019, from https://github.com/stereolabs/zed-unity.

Anna Syberfeldt, Oscar Danielsson, Magnus Holm, and Lihui Wang. 2015. Visual assembling guidance using augmented reality. Procedia Manufacturing 1 (2015), 98-109.

Richard Tang, Xing-Dong Yang, Scott Bateman, Joaquim Jorge, and Anthony Tang. 2015. Physio@Home: Exploring visual guidance and feedback techniques for physiotherapy exercises. In Proceedings of the 33rd Annual ACM Conference on Human Factors in Computing Systems. ACM, 4123-4132.

Balasaravanan Thoravi Kumaravel, Fraser Anderson, George Fitzmaurice, Bjoern Hartmann, and Tovi Grossman. 2019a. Loki: Facilitating Remote Instruction of Physical Tasks Using Bi-Directional Mixed-Reality Telepresence. In Proceedings of the 32nd Annual ACM Symposium on User Interface Software and Technology. 161-174.

Balasaravanan Thoravi Kumaravel, Cuong Nguyen, Stephen DiVerdi, and Björn Hartmann. 2019b. TutoriVR: A Video-Based Tutorial System for Design Applications in Virtual Reality. In Proceedings of the 2019 CHI Conference on Human Factors in Computing Systems. ACM, 284.

Unity. 2019. Unity. (2019). Retrieved Sep. 18, 2019, from RetrievedSep. 19, 2019,fromhttps://unity.com.

Jonathan Wai, David Lubinski, and Camilla P Benbow. 2009. Spatial ability for STEM domains: Aligning over 50 years of cumulative psychological knowledge solidifies its importance. Journal of Educational Psychology 101, 4 (2009), 817.

Fraser Anderson, Tovi Grossman, Justin Matejka, and George Fitzmaurice. 2013. YouMove: enhancing movement training with an augmented reality mirror. In Proceedings of the 26th annual ACM symposium on User interface software and technology. ACM, 311-320.

James Baumeister, Seung Youb Ssin, Neven AM ElSayed, Jillian Dorrian, David P Webb, James A Walsh, Timothy M Simon, Andrew Irlitti, Ross T Smith, Mark Kohler, and others. 2017. Cognitive cost of using augmented reality displays. IEEE transactions on visualization and computer graphics 23, 11 (2017), 2378-2388.

Bhaskar Bhattacharya and Eliot H Winer. 2019. Augmented reality via expert demonstration authoring (AREDA). Computers in Industry 105 (2019), 61-79.

Boeing. 2019. Boeing: The Boeing Company. (2019). Retrived Jun. 2, 2019 from https://www.boeing.com/.

John Brooke and others. 1996. SUS-A quick and dirty usability scale. Usability evaluation in industry 189, 194 (1996), 4-7.

Techsmith Camtasia. 2019. Camtasia: Screen Recorder and Video Editor. (2019). Retrieved Sep. 18, 2019, from https://www.techsmith.com/video-editor.html.

Scott Carter, Pernilla Qvarfordt, Matthew Cooper, and Ville Mäkelä. 2015. Creating tutorials with web-based authoring and heads-up capture. IEEE Pervasive Computing 14, 3 (2015), 44-52.

Pei-Yu Chi, Joyce Liu, Jason Linder, Mira Dontcheva, Wilmot Li, and Bjoern Hartmann. 2013. Democut: generating concise instructional videos for physical demonstrations. In Proceedings of the 26th annual ACM symposium on User interface software and technology. 141-150.

Pei-Yu Peggy Chi, Daniel Vogel, Mira Dontcheva, Wilmot Li, and Björn Hartmann. 2016. Authoring illustrations of human movements by iterative physical demonstration. In Proceedings of the 29th Annual Symposium on User Interface Software and Technology. ACM, 809-820.

D'Vera Cohn and Paul Taylor. 2010. Baby Boomers Approach 65—Glumly. (Dec. 2010). Retrieved Sep. 15, 2019 from https://www.pewresearch.org/fact-tank/2010/12/29/baby-boomers-retire/.

Dima Damen, Teesid Leelasawassuk, Osian Haines, Andrew Calway, and Walterio W Mayol-Cuevas. 2014. You-Do, I-Learn: Discovering Task Relevant Objects and their Modes of Interaction from Multi-User Egocentric Video.. In BMVC, vol. 2. 3.

Richard Tang, Xing-Dong Yang, Scott Bateman, Joaquim Jorge, and Anthony Tang. 2015. Physio@Home: Exploring visual guidance and feedback techniques for physiotherapy exercises. In Proceedings of the 33rd Annual ACM Conference on Human Factors in Computing Systems. ACM, 4123-4132. (10 Pages).

Daniel Eckhoff, Christian Sandor, Christian Lins, Ulrich Eck, Denis Kalkofen, and Andreas Hein. 2018. TutAR: augmented reality tutorials for hands-only procedures. In Proceedings of the 16th ACM SIGGRAPH International Conference on Virtual-Reality Continuum and its Applications in Industry. ACM, 8.

Carmine Elvezio, Mengu Sukan, Ohan Oda, Steven Feiner, and Barbara Tversky. 2017. Remote collaboration in AR and VR using virtual replicas. In ACM SIGGRAPH 2017 VR Village. 1-2.

Michele Fiorentino, Rafael Radkowski, Christian Stritzke, Antonio E Uva, and Giuseppe Monno. 2013. Design review of CAD assemblies using bimanual natural interface. International Journal on Interactive Design and Manufacturing (IJIDeM) 7, 4 (2013), 249-260.

Markus Funk, Mareike Kritzler, and Florian Michahelles. 2017. HoloCollab: a shared virtual platform for physical assembly training using spatially-aware head-mounted displays. In Proceedings of the Seventh International Conference on the Internet of Things. 1-7.

Markus Funk, Lars Lischke, Sven Mayer, Alireza Sahami Shirazi, and Albrecht Schmidt. 2018. Teach Me Howl Interactive Assembly Instructions Using Demonstration and In-Situ Projection. In Assistive Augmentation. Springer, 49-73.

GIMP. 2019. GIMP: GNU Image Manipulation Program. (2019). Retrieved Sep. 18, 2019, from https://www.gimp.org.

Oliver Glauser, Shihao Wu, Daniele Panozzo, Otmar Hilliges, and Olga Sorkine-Hornung. 2019. Interactive hand pose estimation using a stretch-sensing soft glove. ACM Transactions on Graphics (TOG) 38, 4 (2019), 41.

Google. 2020. Google Public Dataset. (2020). Retrieved May 5, 2020, from https://cloud.google.com/bigquery/public-data/.

Michihiko Goto, Yuko Uematsu, Hideo Saito, Shuji Senda, and Akihiko Iketani. 2010. Task support system by displaying instructional video onto AR workspace. In 2010 IEEE International Symposium on Mixed and Augmented Reality. IEEE, 83-90.

Ankit Gupta, Dieter Fox, Brian Curless, and Michael Cohen. 2012. DuploTrack: a real-time system for authoring and guiding duplo

(56) References Cited

OTHER PUBLICATIONS block assembly. In Proceedings of the 25th annual ACM symposium on User interface software and technology. ACM, 389-402.

Matthias Haringer and Holger T Regenbrecht. 2002. A pragmatic approach to augmented reality authoring. In Proceedings. International Symposium on Mixed and Augmented Reality. IEEE, 237-245. 12.

Steven Henderson and Steven Feiner. 2010. Exploring the benefits of augmented reality documentation for maintenance and repair. IEEE transactions on visualization and computer graphics 17, 10 (2010), 1355-1368.

Kaggle Inc. 2019. Kaggle: Your Home for Data Science. (2019). Retrieved Sep. 18, 2019, from https://www.kaggle.com/.

Inkscape. 2019. Inkscape: Draw Freely. (2019). Retrieved Sep. 18, 2019, from https://inkscape.org.

Deloitte Insights. 2018. Deloitte skills gap and future of work in manufacturing study. (2018). Retrieved Sep. 18, 2019, from https://www2.deloitte.com/content/dam/insights/US/articles/4736_2018-Deloitte-skills-gap-FoW-manufacturing/Dl_2018-Deloitte-skills-gap-FoW-manufacturing-study.pdf.

SAE International. 2019. Formula SAE. (2019).Retrieved Sep. 18, 2019, fromhttps://www.sae.org.

Jarrod Knibbe, Tovi Grossman, and George Fitzmaurice. 2015. Smart makerspace: An immersive instructional space for physical tasks. In Proceedings of the 2015 International Conference on Interactive Tabletops & Surfaces. 83-92.

Taihei Kojima, Atsushi Hiyama, Takahiro Miura, and Michitaka Hirose. 2014. Training archived physical skill through immersive virtual environment. In International Conference on Human Interface and the Management of Information. Springer, 51-58.

Thomas Kubitza and Albrecht Schmidt. 2015. Towards a toolkit for the rapid creation of smart environments. In International Symposium on End User Development. Springer, 230-235.

Suha Kwak, Woonhyun Nam, Bohyung Han, and Joon Hee Han. 2011. Learning occlusion with likelihoods for visual tracking. In 2011 International Conference on Computer Vision. IEEE, 1551-1558.

David F Lohman. 1996. Spatial ability and g. Human abilities: Their nature and measurement 97 (1996), 116.

Michael R Marner, Andrew Irlitti, and Bruce H Thomas. 2013. Improving procedural task performance with augmented reality annotations. In 2013 IEEE International Symposium on Mixed and Augmented Reality (ISMAR). IEEE, 39-48.

Lockheed Martin. 2019. ow Lockheed Martin is Using Augmented Reality in Aerospace Manufacturing. (2019). Retrived from https://www.engineering.com/ AdvancedManufacturing/ArticleID/19450.

Microsoft. 2020. Overview of Dynamics 365 Guides. (2020). Retrieved May 5, 2020, from https://docs.microsoft.com/en-us/dynamics365/mixed-reality/guides/.

Peter Mohr, Bernhard Kerbl, Michael Donoser, Dieter Schmalstieg, and Denis Kalkofen. 2015. Retargeting technical documentation to augmented reality. In Proceedings of the 33rd Annual ACM Conference on Human Factors in Computing Systems. ACM, 3337-3346.

Peter Mohr, David Mandl, Markus Tatzgern, Eduardo Veas, Dieter Schmalstieg, and Denis Kalkofen. 2017. Retargeting video tutorials showing tools with surface contact to augmented reality. In Proceedings of the 2017 CHI Conference on Human Factors in Computing Systems. ACM, 6547-6558.

Lars Müller, Ilhan Aslan, and Lucas Krüßen. 2013. GuideMe: A mobile augmented reality system to display user manuals for home appliances. In International Conference on Advances in Computer Entertainment Technology. Springer, 152-167.

Oculus. 2019a. Oculus Rift Store. (2019). Retrieved Sep. 18, 2019, from https://www.oculus.com/experiences/rift.

Oculus. 2019b. Oculus Software Development Kit. (2019). Retrieved Sep. 18, 2019, from https://developer.oculus.com.

Ohan Oda, Carmine Elvezio, Mengu Sukan, Steven Feiner, and Barbara Tversky. 2015. Virtual replicas for remote assistance in virtual and augmented reality. In Proceedings of the 28th Annual ACM Symposium on User Interface Software & Technology. 405-415.

SK Ong and ZB Wang. 2011. Augmented assembly technologies based on 3D bare-hand interaction. CIRP annals 60, 1 (2011), 1-4.

Nils Petersen and Didier Stricker. 2012. Learning task structure from video examples for workflow tracking and authoring. In 2012 IEEE International Symposium on Mixed and Augmented Reality (ISMAR). IEEE, 237-246.

PTC. 2019. Vuforia Expert Capture. (2019). Retrieved May 5, 2020, from https://www.ptc.com/en/products/augmented-reality/vuforia-expert-capture.

Sang Ho Yoon, Ansh Verma, Kylie Peppler, and Karthik Ramani. 2015. HandiMate: exploring a modular robotics kit for animating crafted toys. In Proceedings of the 14th International Conference on Interaction Design and Children. ACM, 11-20.

Rafael Radkowski and Christian Stritzke. 2012. Interactive hand gesture-based assembly for augmented reality applications. In Proceedings of the 2012 International Conference on Advances in Computer-Human Interactions. Citeseer, 303-308.

Vijaimukund Raghavan, Jose Molineros, and Rajeev Sharma. 1999. Interactive evaluation of assembly sequences using augmented reality. IEEE Transactions on Robotics and Automation 15, 3 (1999), 435-449.

Joseph Redmon, Santosh Divvala, Ross Girshick, and Ali Farhadi. 2016. You only look once: Unified, real-time object detection. In Proceedings of the IEEE conference on computer vision and pattern recognition.779-788.

Joseph Redmon and Ali Farhadi. 2017. YOLO9000: better, faster, stronger. In Proceedings of the IEEE conference on computer vision and pattern recognition. 7263-7271.

\* cited by examiner

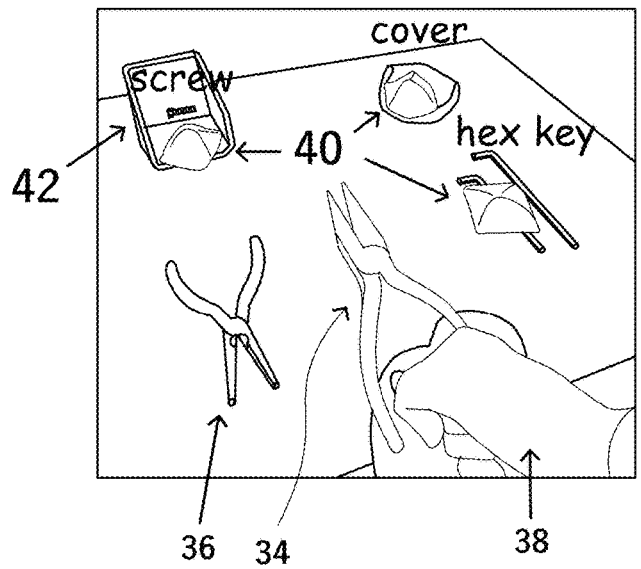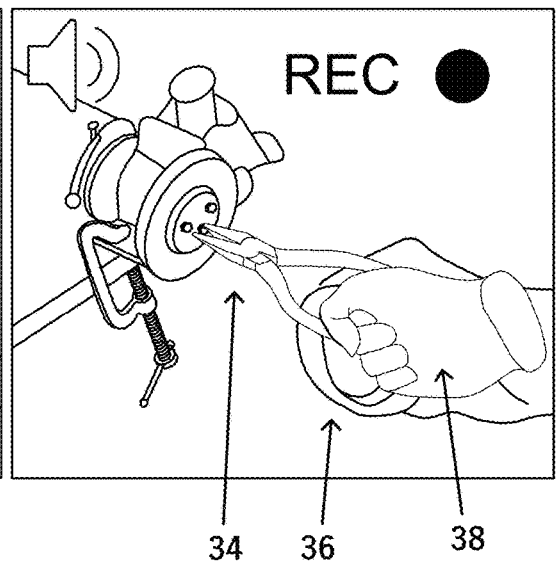
FIG. 5  FIG. 6
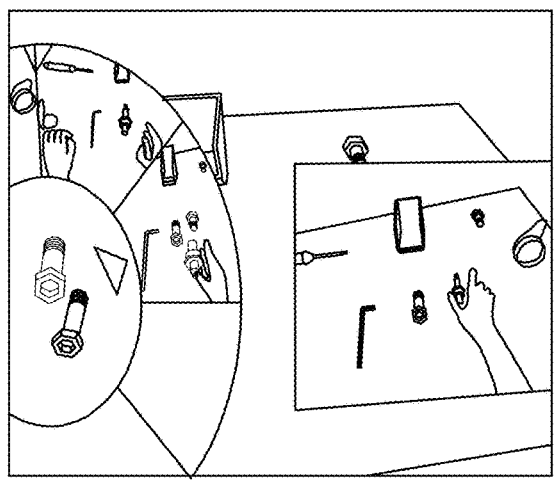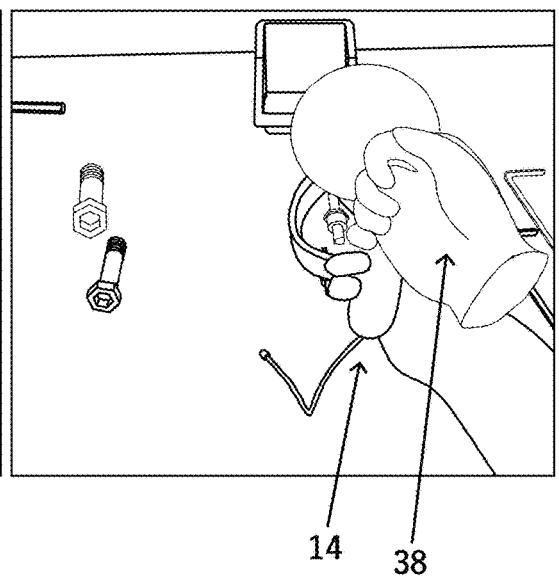
FIG. 7  FIG. 8

SYSTEM AND METHOD FOR GENERATING ASYNCHRONOUS AUGMENTED REALITY INSTRUCTIONS

CROSS-REFERENCE TO RELATED APPLICATIONS

This application is a continuation application of U.S. patent application Ser. No. 17/085,620 entitled "System and Method for Generating Asynchronous Augmented Reality Instructions" by Ramani et al., filed on Oct. 30, 2020, the disclosure of which is hereby incorporated herein by reference in its entirety. U.S. patent application Ser. No. 17/085,620 claims priority to U.S. Provisional Application Ser. No. 62/927,685 entitled "Augmented Reality Based Tool to Create In Situ Procedural 3D Augmented Reality Instructions" by Ramani et al., filed Oct. 30, 2019, and to U.S. Provisional Application Ser. No. 63/046,241 entitled "An Augmented Reality-Based Tool to Create Asynchronous Procedural 3D and 2D AR Instruction" by Ramani et al., filed Jun. 30, 2020, the disclosures of which are hereby incorporated herein by reference in their entireties.

GOVERNMENT LICENSE RIGHTS

This invention was made with government support under grant numbers DUE 1839971 and OIA 1937036 both awarded by the National Science Foundation. The government has certain rights in the invention.

TECHNICAL FIELD

The disclosure relates generally to augmented reality and, more particularly, to authoring augmented reality instructions and tutorials.

BACKGROUND

Spatial ability has been defined as "the ability to generate retain, retrieve, and transform well-structured visual images in spatial relations among objects or in space." Spatial ability plays a critical role in our everyday lives; tasks, such as assembly, tool manipulation, and navigation depend on our spatial abilities.

Many tasks in an industrial or manufacturing environment are spatial in nature. Training new employees to perform tasks in these environments is critical as skilled workers retire or leave to find new jobs elsewhere. Currently, there are three modalities typically used for training employees in spatial tasks: one-on-one instructions, paper/sketch-based instructions, and video-based instructions.

Many industries still use one-on-one training to train their employees for tasks, such as machine operation and assembly. Although reliable, this mode of training is still inefficient in terms of time, cost and scalability. One-on-one training requires active feedback and communication between the trainers, i.e. subject matter experts (SMEs) and the trainees, i.e., novices.

Paper/sketch-based training (e.g., training manuals) use written instructions and/or pictures to teach a novice how to perform a task. This modality is also inefficient due to the amount of time required to put the instructions into a document format. While this modality is scalable, the instructions themselves can be hard to follow and require a novice to interpret and follow the instructions in a new environment without assistance.

Video-based instructions can make instructions easier for a novice to follow. However, creating the videos can be time-consuming and inefficient due to having to reposition the camera and/or have someone else hold the camera, and it can require expertise in video capturing and editing.

Augmented reality (AR) is an efficient form of delivering spatial information and has the potential for training workers. However, AR is still not widely used due to the technical skills, expertise, and costs required to develop content. AR applications often have to consider the location of virtual objects relative to the variable environment, increasing the complexity of creating AR content. In addition, knowledge of 3D modeling and animation are required if usable instruction sets are to be created by the author. This can be a tedious, time-consuming, expertise-intensive activity. It can typically require multi-person collaboration, which is not only costly, but also a major impediment to AR content creation and widespread success of AR itself. The costly nature of AR content creation limits the ability of smaller businesses and organizations to implement AR as a possible training tool.

SUMMARY

According to one embodiment, a method of operating an augmented reality (AR) system includes capturing images of a first real-world workspace using a camera of a first head mounted AR device of the AR system being worn by a first user, processing the images using a first processor of the AR system to identify physical objects in the first real-world workspace and detect 3D positions of the identified physical objects in a 3D space corresponding to the first real-world workspace, rendering virtual objects representing the identified physical objects on the display of the first head mounted AR device at the respective 3D positions for the identified physical objects, manipulating a first one of the virtual objects using at least one hand-held controller of the AR system in a manner that mimics a performance of a first procedural task using the physical object associated with the first one of the virtual objects, recording the manipulation of the first one of the virtual objects that mimics the performance of the first procedural task as first augmented reality content, and storing the first augmented reality content in a memory of the AR system.

According to another embodiment, a method of operating an augmented reality (AR) system includes capturing images of a first real-world workspace using a camera of a first head mounted AR device of the AR system being worn by a first user, processing the images using a first processor of the AR system to identify physical objects in the first real-world workspace and detect 3D positions of the identified physical objects in a 3D space corresponding to the first real-world workspace, rendering virtual objects representing the identified physical objects in the 3D space at the respective 3D positions for the identified physical objects, displaying the virtual objects on a display of the head mounted AR device, recording a first 2D video of the user manipulating a first one of the identified physical objects to perform a first procedural task, attaching the first 2D video to the virtual object corresponding to the first one of the physical objects, and storing the first 2D video in a memory of the AR system.

According to yet another embodiment, an augmented reality (AR) system includes a head mounted AR device including at least one camera, and a display, at least one hand-held controller, sensors configured to detect positions, movements and orientations of the head mounted AR device and the at least one hand-held controller, a processing system including a processor and memory, and programmed instructions stored on the memory for execution by the processor, the programmed instructions being configured to cause the processor to: process images captured by the camera of the head mounted AR device to identify physical objects in the real-world workspace and detect 3D positions of the identified physical objects in a 3D space corresponding to the real-world workspace; render virtual objects representing the identified physical objects in the 3D space at the respective 3D positions for the identified physical objects on the display of the head mounted AR device; enable manipulation of the virtual objects using the hand-held controllers; record the manipulation of the virtual objects as augmented reality content; store the augmented reality content in the memory; and selectively render the augmented reality content in the display of the head mounted AR device.

BRIEF DESCRIPTION OF THE DRAWINGS

FIGS. 5-8 depict images of interactions with virtual objects rendered on the display of the head mounted AR device of FIG. 1.

DETAILED DESCRIPTION

Figure 1:
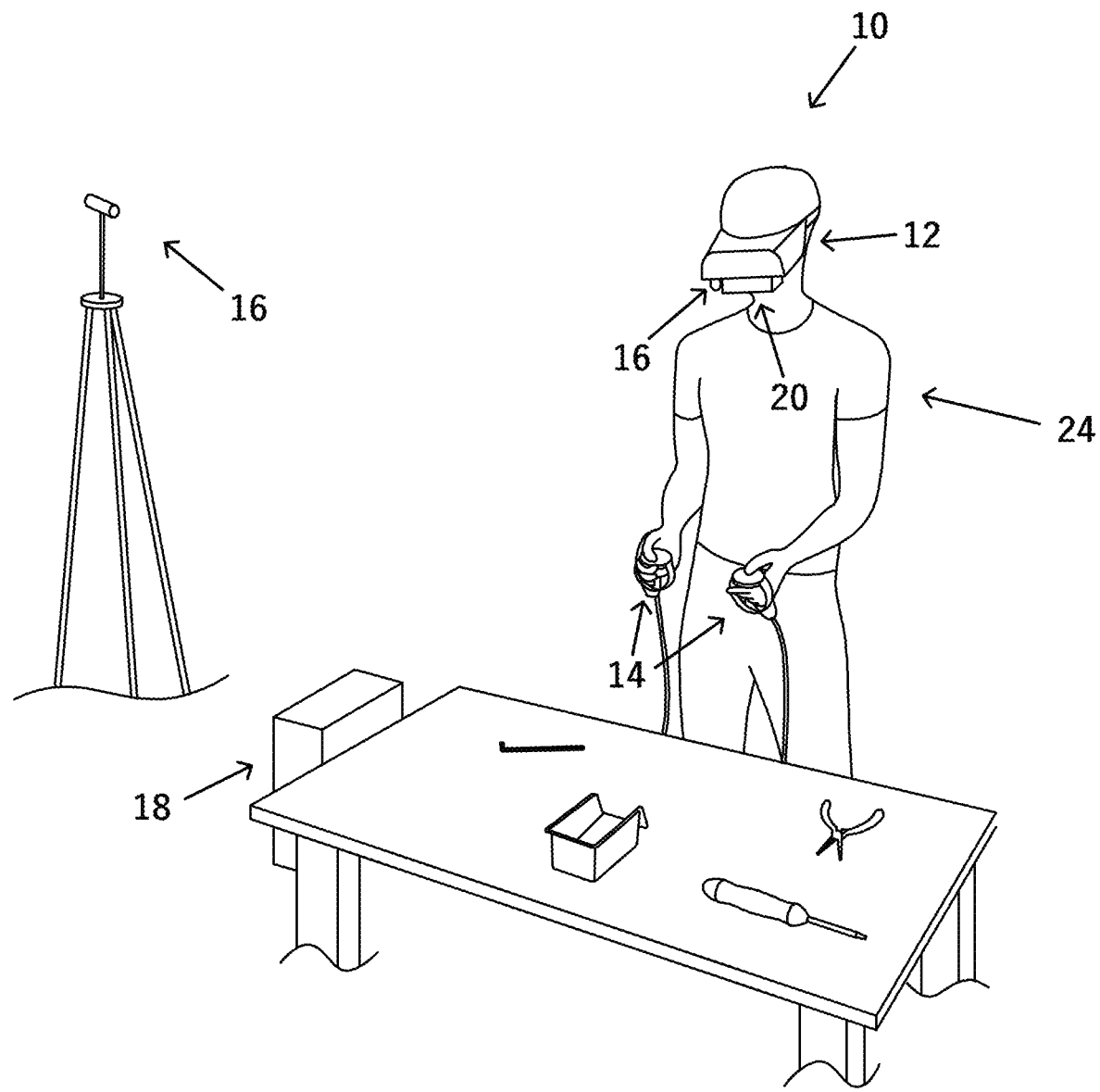
FIG. 1 is perspective view of an AR system in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

The present disclosure is directed to an AR-based system, referred to herein as ProcessAR, to develop 2D and 3D procedural instructions for asynchronous AR consumption. ProcessAR is an AR authoring system designed to improve the tutorial creation process of spatio-temporal tasks by leveraging the advantages of combining an object recognition system with virtual object rendering. The system detects and recognizes physical objects and their 3D positions within a real-world workspace utilizing an integrated computer vision algorithm within a 3D interface and renders virtual objects, e.g., tools, parts, and the like, which are overlaid on the physical objects in real-time. The user is then able to interact with the virtual objects in performing procedural tasks and record and edit these interactions in situ without having to leave the workspace. This feature provides a major advantage by significantly reducing the authoring time for AR content creation. It eliminates the need for transitioning between different modalities and interfaces to create and edit content as would otherwise be required with video and paper instructions. A novice user can then consume the AR content created by the SME asynchronously to learn and perform the procedural tasks. All of the processes, i.e., capturing augmented reality content in the head mounted AR device, create and edit AR content in the head mounted AR device, and consume the content in the AR device, was not possible seamlessly before the implementation of the system described herein.

Figure 2:
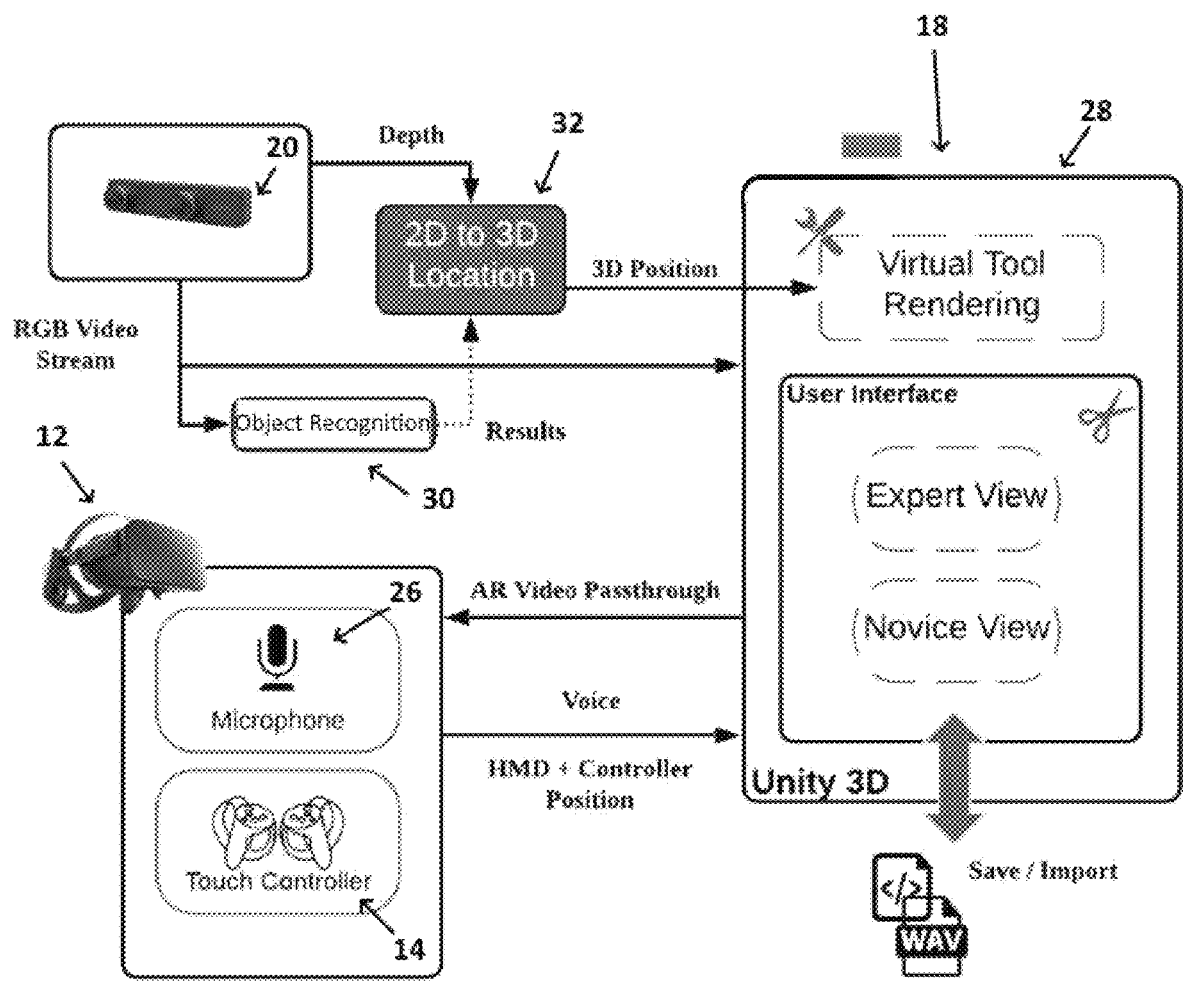
FIG. 2 is schematic illustration of portions of the AR system of FIG. 1.
Figure 3:
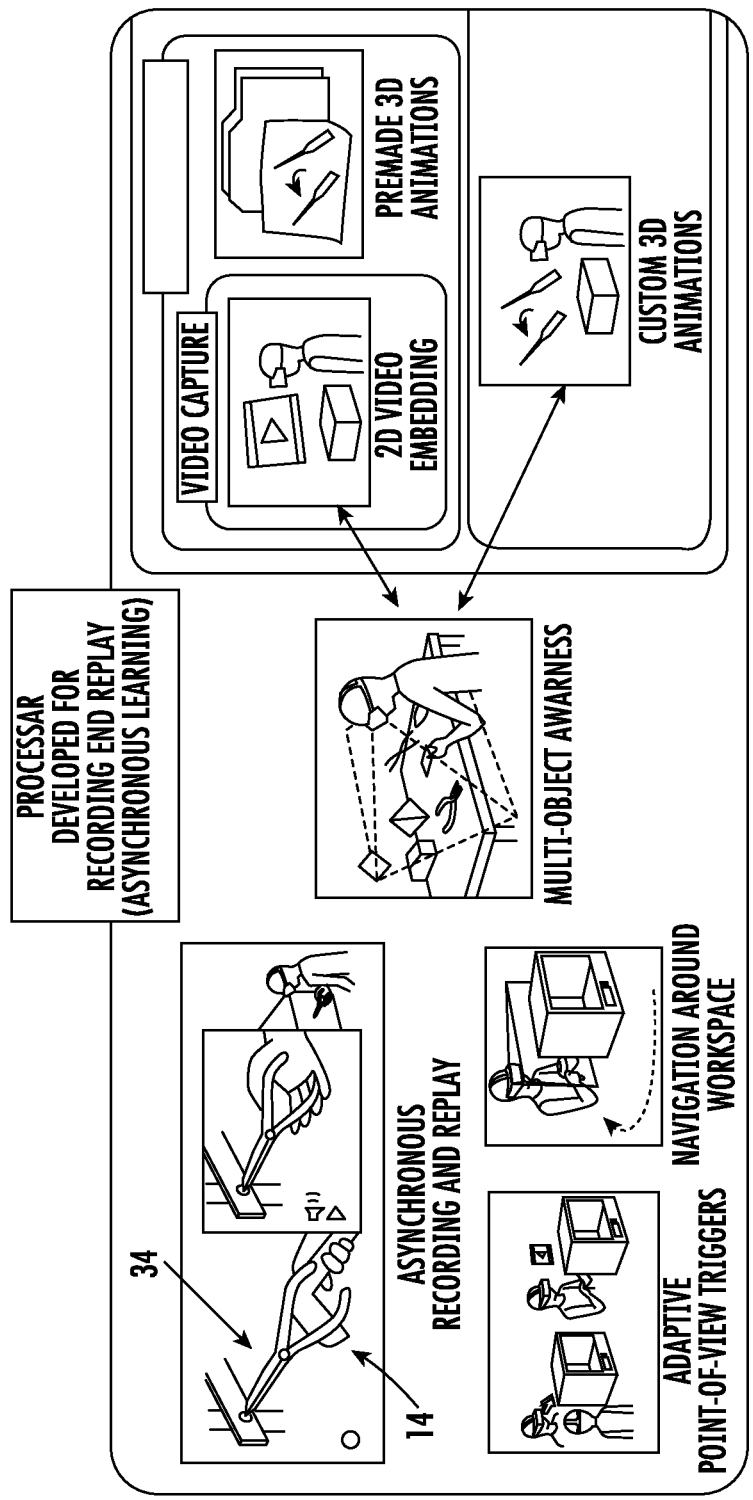
FIG. 3 is a schematic illustration of the functionality of the AR system of FIG. 1.

An exemplary embodiment of an AR system 10 in accordance with the present disclosure is depicted in FIGS. 1-3. The exemplary AR system 10 includes a head mounted AR device 12, hand-held controllers 14, sensors 16, and a processing system 18. The head mounted AR device 12 includes at least one camera 20, a microphone 26 (FIG. 1), and a display screen (not visible). In one example, the head mounted AR device 12 is in the form of an AR or virtual reality headset (e.g., Hololens, Oculus Rift, or Oculus Quest).

The camera 20 is configured to capture a plurality of images of the workspace 22 as the head mounted AR device 10 is moved around the workspace 22 by a user 24. In one embodiment, the camera 20 is an integrated or attached stereo-camera (e.g., ZED Dual 4MP Camera (720p)). The camera 20 is configured to generate image frames of the environment 50, each of which comprises a two-dimensional array of pixels. Each pixel has corresponding photometric information (intensity, color, and/or brightness) as well as geometric information (depth and/or distance). One or more cameras are configured to provide depth information, e.g., the distance between the camera and the center of an object.

Figure 4:
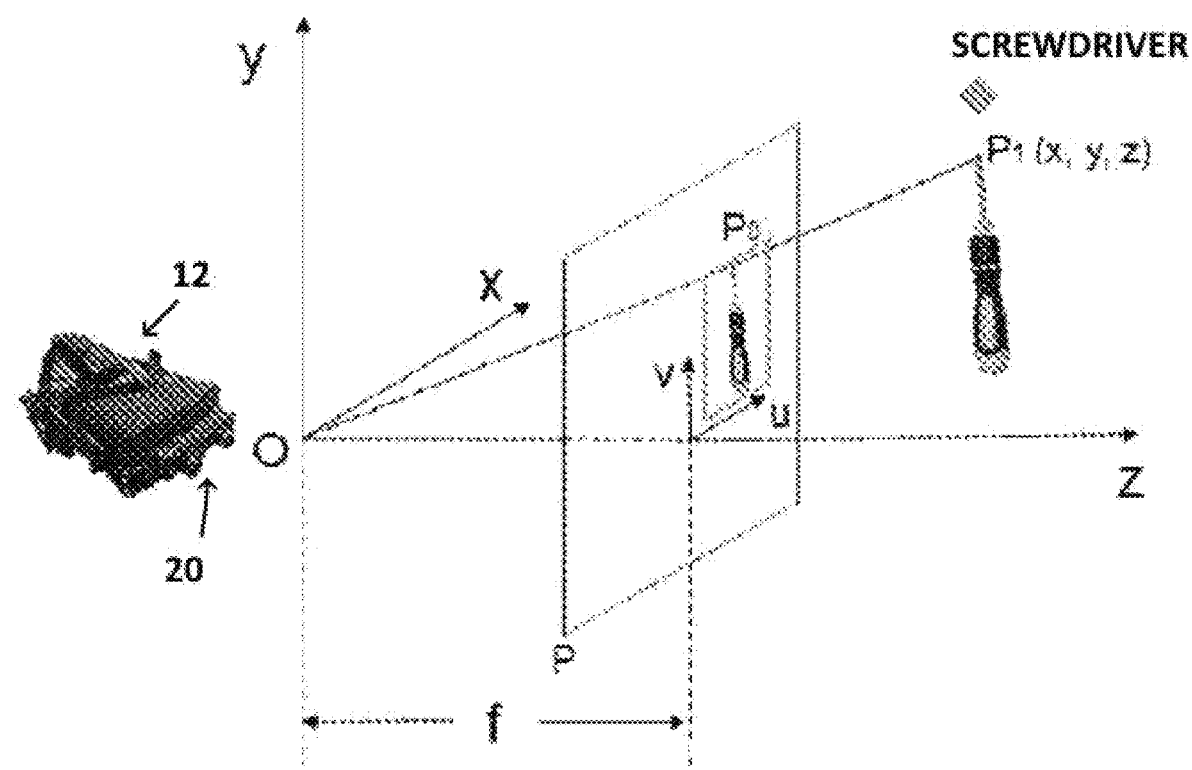
FIG. 4 is a schematic illustration of a pinhole camera model for deriving depth information from images.

The camera 20 may be configured to provide depth information based on a pinhole camera model, as depicted in FIG. 4. FIG. 4 shows a camera with a center of position (COP) O, a principal axis parallel to the Z axis, and an image plane P at the focus distance, which corresponds to a focal length away form the optical center O. Considering similar triangles, the relationship between the 3D world coordinates (P1(x, y, z) and the corresponding carmera's image plane point P0(x0, y0) is gen by: $x=fx/z, y=fy/z$. This relationship is based on measuring the pixel coordinates with respect to a Principal Point (P, px, py). A corner of the image frame may be used as the Principal Point. Using the corner P as the image origin, the above formula is updated to: $x=fx/x+px, y=fy/x+py$. In other embodiments depth information may be provided in any suitable manner. For example, the camera may take the form of two cameras configured to capture stereoscopic images, from which depth and/or distance information can be derived.

The microphone 26 is an integrated or attached recording device that enables the user's voice to be recorded while authoring AR content. The microphone may be activated and deactivated in any suitable manner. For example, the microphone may be activated and deactivated using the hand-held controllers and/or via interaction with a graphical user interface displayed on the display device of the head mounted AR device.

The display screen may comprise any of various known types of displays, such as LCD or OLED screens. In at least one embodiment, the display screen is a transparent screen, through which a user can view the outside world, on which certain graphical elements are superimposed onto the user's view of the outside world. In the case of a non-transparent display screen, the graphical elements may be superimposed on real-time images/video captured by the camera 20.

In some embodiments, the head mounted AR device 12 may further comprise a variety of sensors 16. In some embodiments, the sensors include sensors configured to measure one or more accelerations and/or rotational rates of the head mounted AR device 12. In one embodiment, the sensors comprises one or more accelerometers configured to measure linear accelerations of the head mounted AR device 12 along one or more axes (e.g., roll, pitch, and yaw axes) and/or one or more gyroscopes configured to measure rotational rates of the head mounted AR device 12 along one or more axes (e.g., roll, pitch, and yaw axes). In some embodiments, the sensors may include inside-out motion tracking sensors configured to track human body motion of the user 24 within the workspace 22, in particular positions and movements of the head and hands of the user 24.

The head mounted AR device may comprise one or more transceivers, modems, or other communication devices (not shown) configured to enable communications with various other devices. Particularly, in at least one embodiment, the head mounted AR device 12 comprises a Wi-Fi module. The Wi-Fi module is configured to enable communication with a Wi-Fi network and/or Wi-Fi router (not shown) and includes at least one transceiver with a corresponding antenna, as well as any processors, memories, oscillators, or other hardware conventionally included in a Wi-Fi module.

The head mounted AR device 12 may also include a battery or other power source (not shown) configured to power the various components within the head mounted AR device 12, which may include the processing system 18, as mentioned above. In one embodiment, the battery of the head mounted AR device 12 is a rechargeable battery configured to be charged when the head mounted AR device 12 is connected to a battery charger configured for use with the head mounted AR device 12.

The AR system 20 further includes at least one hand-held controller 14 (e.g., Oculus Touch Controllers) having a user interface a user interface (not shown) and sensors (not shown). The user interface comprises, for example, one or more buttons, joysticks, triggers, or the like configured to enable the user to interact with the AR system by providing inputs. In one embodiment, the sensors may comprise one or more accelerometers configured to measure linear accelerations of the hand-held controller 22 along one or more axes and/or one or more gyroscopes configured to measure rotational rates of the hand-held controller 14 along one or more axes. The hand-held controller(s) 14 further include one or more transceivers (not shown) configured to communicate inputs from the user 24 to the processing system 18. In some embodiments, rather than being grasped by the user, the hand-held controller(s) 14 are in the form of a glove, which is worn by the user and the user interface includes sensors for detecting gesture-based inputs or the like.

The AR system 10 is configured to track human body motion of the user 24 within the workspace 22, in particular positions and movements of the head and hands of the user 24. To this end, the AR system 20 includes sensors 16 (e.g., Oculus IR-LED Sensors) for tracking the track human body motion of the user 24 within the workspace 22. In one embodiment, the sensors 16 comprise internal sensors of the head mounted AR device and hand-held controllers 14. In some embodiments, external tracking sensors may be used. For example, three tracking sensors may be utilized in the workspace (only one external sensor 16 is visible in FIG. 1). The three sensors include two sensors which are positioned above the workspace and facing downwardly toward the workspace and one sensor proximate the floor below the workspace and facing upwardly.

In the illustrated exemplary embodiment, the processing system 18 comprises a processor and a memory. The memory is configured to store data and program instructions that, when executed by the processor, enable the AR system 10 to perform various operations described herein. The memory may be of any type of device capable of storing information accessible by the processor, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor may include a system with a central processing unit, graphics processing units, multiple processing units, dedicated circuitry for achieving functionality, programmable logic, or other processing systems.

The program instructions stored on the memory include an augmented reality (AR) graphics engine 28 (e.g., Unity3D engine), which acts as an intuitive visual interface for the HRC program 33. Particularly, the processor is configured to execute the AR graphics program 28 to superimpose on the display screen of the head mounted AR device 12 augmented reality content for the purpose of authoring tutorials for performing procedural tasks so as to guide novice users during performance of such tasks. In the case of a non-transparent display screen, the augmented reality content may be superimposed on real-time images/video captured by the camera 20.

As used herein, "augmented reality content" refers to one or more data files including one or more virtual or digital elements that are to be or can be superimposed upon real-time images or video of a real-world environment. The virtual or digital elements may include any audio, visual, and/or graphical elements. For example, the virtual or digital elements may include two-dimensional images, sprites, icons, textures, vector graphics, or similar. Additionally, the virtual or digital elements may include three-dimensional models, polygon meshes, point clouds, or similar. Likewise, the virtual or digital elements may include two-dimensional or three-dimensional animations, recorded motion capture data, videos, or any other time sequence of graphical content. The virtual or digital elements may include interactive and/or dynamic content such as another augmented reality project, in which interactions and animations have been built already.

Real-time object detection and recognition is essential to create responsive interactions between the user and the virtual representations of physical objects in the workspace. The programmed instructions stored in the memory include an object recognition program (e.g., YOLO 13) which is configured to be executed by the processor which enables the images captured by the camera 20 of the head mounted AR device 12 to processed to detect physical objects which the program has been trained to detect. Object detection and recognition is a computer vision task that involves both localizing one or more objects within an image and classifying each object in the image.

In one embodiment, the processor is configured to apply a deep learning neural network (also referred to as deep networks and deep neural networks) to identify objects in an image based on past information about similar objects that the detector has learned based on training data (e.g., training data can include images of objects that are expected to be found in the workspace). The network splits the input image into a grid of cells and each cell directly predicts a bounding box and object classification as well as a confidence that the classification is what is predicted. Any suitable type of deep learning network can be used, including convolutional neural networks (CNNs), autoencoders, deep belief nets (DBNs), Recurrent Neural Networks (RNNs), among others. One exemplary example of a deep learning network detection methodology that can be used includes a You only look once (YOLO) system.

During runtime, a copy of each camera frame is preprocessed and fed to the network for real time object detection. Once an object is detected, its 2D vector position is combined with depth data, e.g., using a pinhole camera model (FIG. 4), determined from the images to compute the corresponding 3D position 32 of the object. In addition, referring to FIGS. 5-8, a virtual object 34 representing the detected object 36 is rendered on the display. The virtual object 34 is a premade 3D model, eg., CAD model, of the object which has been stored in a virtual model repository created prior to use of the system. The virtual model repository includes 3D models of each object that may be found in the workspace, such as tools, parts, and the like. The 3D positions of the detected objects can then be used to overlay the corresponding virtual object on top of the physical objects in the display of the head mounted AR device.

In order to allow interaction with virtual objects of detected objects, virtual models 38 of the hand-held controllers 14 are also rendered on the display of the head mounted AR device 12. The virtual models may be virtual hands 38. The position, movement and orientation of the controllers 14 are tracked, e.g., using the sensors 16 (FIG. 1). The position, movement, and orientation of the rendered virtual hand representations 38 can then be updated to correspond to the detected positions, movements, and orientations of the hand-held controllers. Actuation of a button or actuator (not shown) on the controller 14 may be configured to cause the virtual hand representations to close or grasp a virtual object 34 (FIGS. 5 and 6) when the virtual hand representations 38 are in the vicinity of a virtual object 34 so that the system knows when an interaction with a virtual object is taking place.

In one embodiment, rather than overlay the virtual models 34 on the corresponding physical objects 36 immediately, virtual markers or placeholders 40 are used which are overlaid on the physical objects 36. The markers 40 each have a label which identifies the type or class of the identified object. The virtual markers 40 are then replaced by the 3D CAD model 34 only upon contact with the virtual hand representations 38 of the hand-held controller 14. The virtual markers 40 may have a predetermined lifetime, which self destructs after a predetermined amount of time if left untouched, thus prompting the system to re-detect the object. Once a virtual marker 40 is selected, the system replaces the marker with the 3D CAD model 34 by accessing the virtual model repository to find a match corresponding to the marker's label.

To compensate for the difficulty of recognizing small objects, such as fasteners, screws, and other small parts, the small objects are treated as a group which is stored in an identifiable container 42, such as a plastic tub or bin. The neural network is then trained to recognize the container 42, e.g., using images of the container, while keeping the same label. For example, a small screw is an objects that tends to have a lower training accuracy. Multiple screws can be grouped in a bin 42 and the network is trained to recognize the bin.

Some procedural tasks involve multiple instances of expendable objects. For example, installing a shelf on a wall requires two shelf brackets and multiple wood screws. The shelf brackets and wood screws would be considered expendable objects in this scenario. Rather than render all of the expendable objects at one which could bring confusion and generate visual clutter in the virtual space, only a single instance of each type of expendable object is rendered at a time. An expendable object is then duplicated at its initially rendered position after the current virtual object is grabbed and/or utilized by the user in demonstrating a procedural task. In contrast, reusable tools, such as screwdrivers and drills were configured to only render once.

Referring now to FIGS. 9-12, a virtual control panel 44 may also be rendered in the display of the head mounted AR device 12 to provide menus and buttons that control functionality of the system and that are selectable using the hand-held controllers 14. For example, a virtual laser point 46 may be rendered when the virtual hand representations 38 are moved over the menu to enable selection of various items on the control panel 44. The panel 44 is rendered in a manner that follows the user's field of the view. The view of the panel 44 may be activated and deactivated with a button or actuator (not shown) on the hand-held controllers 14.

Figures 9, 10:
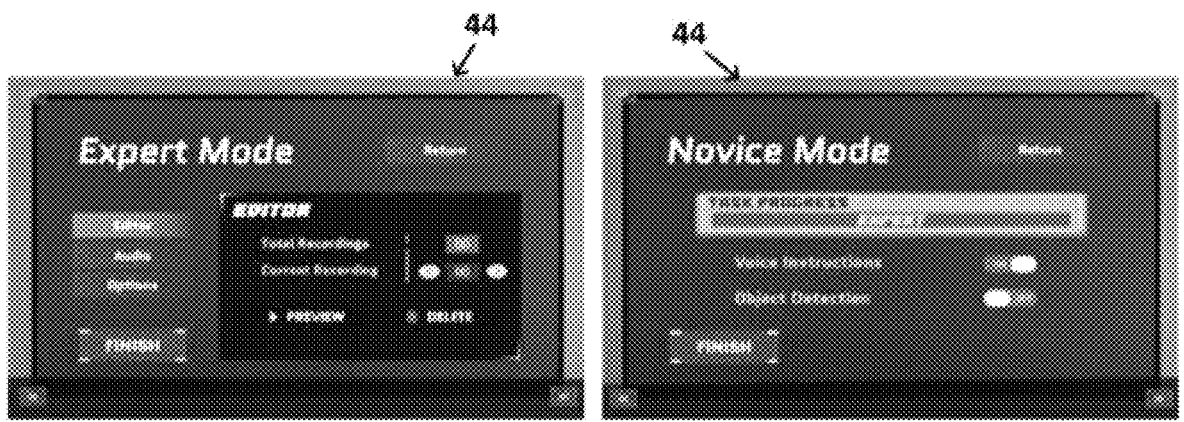
FIGS. 9-12 depict images of virtual control panels for the AR system of FIG. 1 which may be rendered on the display of the head mounted AR device of FIG. 1.
Figure 11:
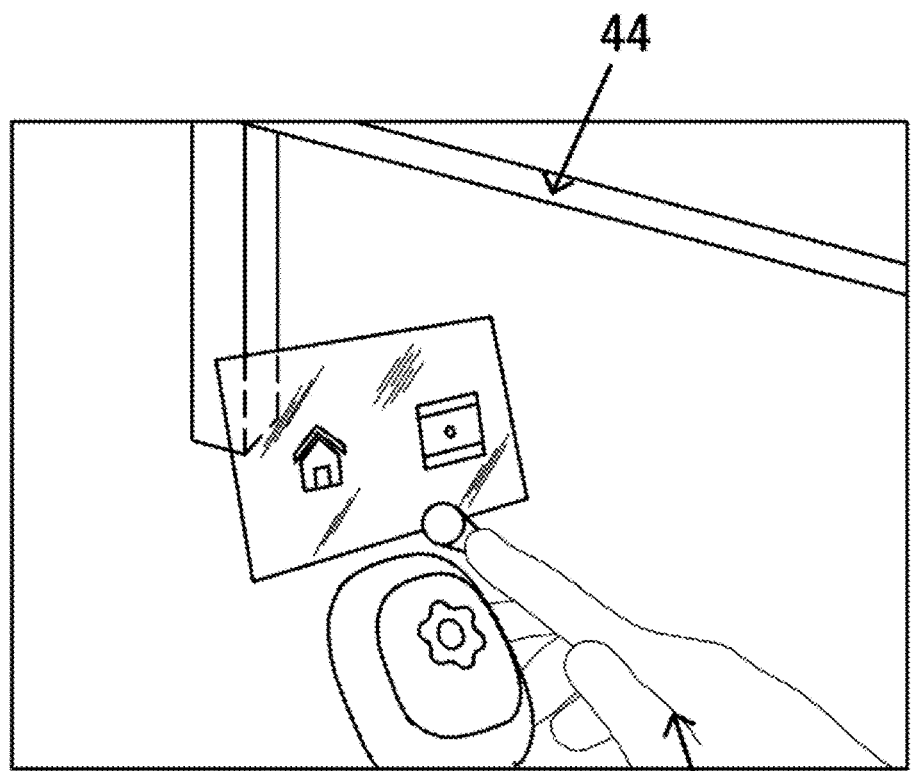
Figure 12:
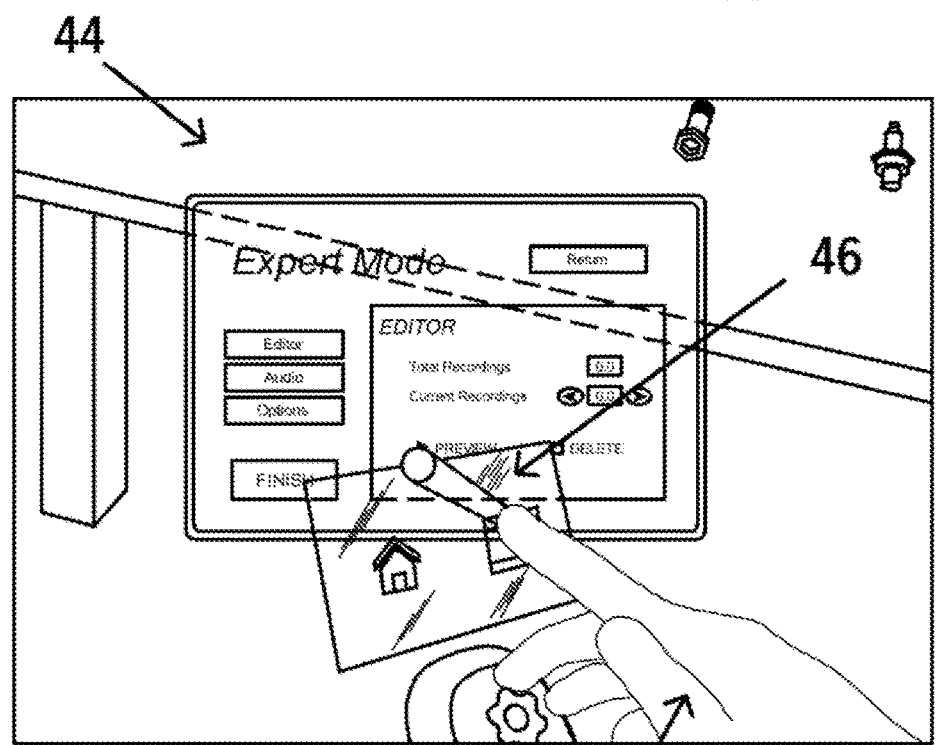

The content displayed on the control panel can change depending on the mode of operation and the skill level of the user. For example, FIG. 9 depicts a virtual control panel 44 that may be used during an authoring mode of the AR system 10, and FIG. 10 depicts a virtual control panel 44 that may be used during a tutorial or teaching mode by a novice user. When in an authoring mode, the control panel may include menus and selectable items that enable previewing and deletion of recorded videos and AR content, as well as displaying information on accumulated recordings. The panel in authoring mode may also include selectable menu items or virtual toggles for activating object detection/recognition and the display of spatial mapping. Using the panel, users are enabled to freely preview and manipulate recorded instructions analogous to the common video editing software. When in a tutorial or teaching mode, the virtual control panel 4 may include menu items and selectable toggles that enable the indication of task completion, project completion status, and activation of object detection and voice instructions. FIG. 11 depicts a control panel that enables the user to switch between AR authoring mode and 2D video authoring mode. The panel in FIG. 11 may be rendered at the wrist of the user as detected by the position of the controller 14.

During use, the system incorporates three phases: (1) scanning the workspace to detect and identify physical objects which are to be used in a procedural task(s) and then rendering virtual objects representing the physical objects in 3D space which are overlaid on the physical objects in real-time; (2) recording/editing the expert's motions and interactions with the virtual objects for the procedural task(s) together with vocal instructions; and (3) a novice consuming the procedural task(s) in the form of 3D animations or embedded 2D videos and the expert's voice instructions. The first two phases constitute the authoring mode of the system during which an SME generates augmented reality content that demonstrates one or procedural tasks which are then stored for asynchronous consumption by a novice user at a later time and/or place. The third phase is the tutorial or teaching mode during which a novice user utilizes the system to view the augmented reality content while performing the procedural task. The asynchronous nature of the instruction enables the user to view, start and stop the augmented reality content as needed without requiring the presence of the SME, instructors or supervisory personnel.

With reference to FIGS. 3 and 5-8, during the authoring mode, an authoring user dons the head mounted AR device 12 in the real-world workspace 22. The workspace 22 includes the tools and parts needed to perform a project which may require a number of different procedural tasks to complete. The system then performs real-time object detection and recognition. This may be activated using a button or actuator on the hand-held controllers 14. Once activated, when objects come into view of the camera 20 of the head mounted AR device 12, the object detection and recognition system processes the images from the camera to identify objects that it has been trained to recognize and provide detection information, which are the object's class and 2D bounding box. The results are processed in the background and the 3D position of the objects are derived from the images using a simple pinhole camera model.

Once the rendering position is computed, Process AR renders a virtual object at the 3D position of the identified object on the display of the head mounted AR device in real-time. In one embodiment, the virtual object representing the associated physical object may at first be a virtual marker 40 or placeholder with a label identifying the associated physical object. The user can then select the markers 40 for the physical objects that will be used in demonstrating procedural tasks, e.g., by touching or contacting the marker using the virtual hand representations of the hand-held controller(s). Once selected, the markers are replaced with the 3D CAD models 34 of the associated objects 36 taken from the virtual model repository. In one embodiment, the user may select markers on a task by task basis by only selecting the markers for the objects that are to be used in a respective procedural task. Alternatively, the user may select the markers for all the objects that are to be used for completing a project across multiple procedural tasks so that virtual objects for all the physical objects used in the project are rendered and visible at the same time. As an alternative to the use of markers, the system may be configured to render 3D virtual models 34 for the identified objects directly without the use of markers prior to instantiation.

Once the virtual models 34 of the physical objects, e.g., tools, parts, and the like, have been rendered on the display at their 3D positions in the virtual workspace, the user then uses the virtual hand representations 38 to manipulate the virtual models 34 to demonstrate, i.e., mimic, the performance of procedural tasks. These demonstrations are recorded and stored in the memory as augmented reality content which can be asynchronously consumed at a later time by another user, such as a novice or trainee. In one embodiment, the user's interactions with the virtual objects 34 are recorded with a script that stores the three translational coordinates for the position, four quaternion coordinates for the orientation, and a time stamp corresponding to the position. The amount of data and the difference in time between each data point varies based on frame rate of the system. As noted above, the recording process may be initiated by actuating a button or trigger when the virtual hand representations 38 are manipulating a virtual object 34. The motion of the virtual object 34 is recorded as long as the user remains in record mode, which in turn enables the user to adjust and reposition the virtual object as needed. Each recording of a procedural task is a self-contained unit, e.g., a file, which is stored in memory. Multiple procedural tasks which are performed as part of a single project may be stored in association with each other.

In conjunction with demonstrating a procedural task by using the virtual hand representations to manipulate virtual objects, voice recordings of the user providing verbal instructions may also be captured using the microphone 26 (FIG. 2). The voice recordings can be used to clarify tasks or to explain possible error cases or to provide any other information which may be useful to a novice user or trainee. The voice recordings are stored in memory as audio files in association with the procedural task being performed at the time of the recording. Time stamps may be used to synchronize the voice recordings with the recordings of the virtual object interactions for the procedural task upon deployment to the novice user.

The virtual control panel 44 (FIGS. 9-12) is rendered in the display to facilitate the instruction creation process. The virtual control panel 44 aids users in keeping track of and editing the recordings of procedural tasks. Virtual buttons and menus provide preview and deletion mechanisms for both virtual object interactions and voice recordings. The activation of object detection and the display of spatial mapping may also be controlled via selections in the virtual control panel. As noted above, a virtual laser pointer 46 may be rendered in place of the virtual hand representations 38 when the virtual hand representations are moved over the control panel to enable more precision in selecting menu items and virtual toggles.

Figure 13:
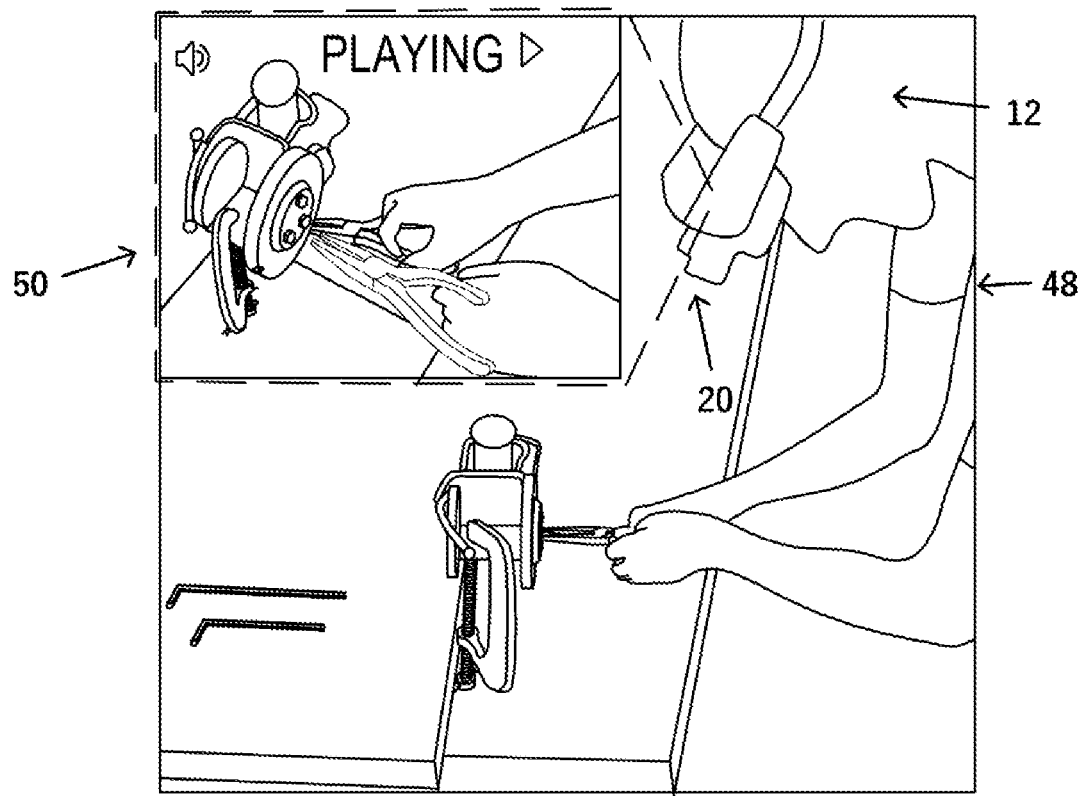
FIGS. 13 and 14 depict images of a novice user performing procedural tasks with the aid of virtual demonstrations created using the AR system of FIG. 1.
Figure 14:
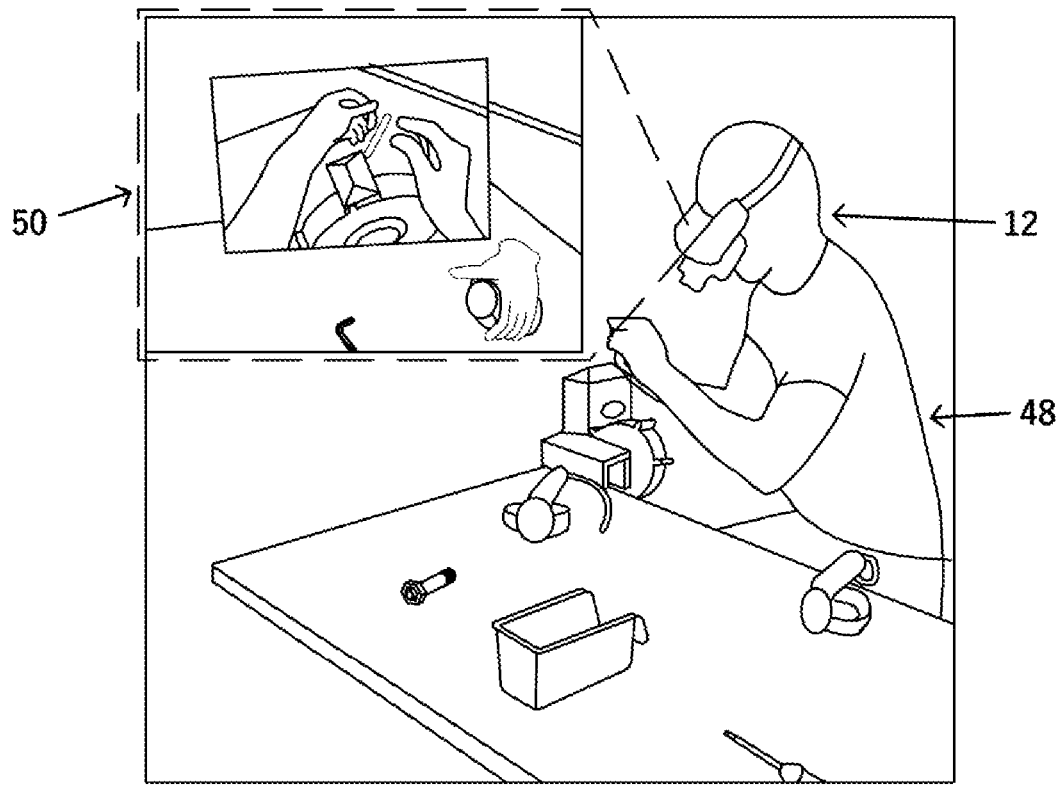

With reference to FIGS. 13 and 14, during the training mode or teaching mode, a novice user 48 wears a head mounted AR device 12 which may be the same as or different from the device worn by the authoring user 24 to create the augmented reality instructions. The novice user 48 may be located in a different workspace than the workspace in which the instructions were created although advantageously the workspace has the same configuration and objects as the original workspace. The user may activate the virtual demonstration 50 of a procedural task by interacting with a virtual control panel (FIG. 10) rendered in the display of the novice user's AR device 12. Prior to the activation of the virtual demonstration 50, the novice user 48 may activate object detection and recognition using the virtual control panel, to identify the physical objects located in the workspace. The virtual demonstration 50 may also be started and stopped as needed by the novice user via the virtual control panel. The virtual control panel may also include a selectable menu item or toggle, e.g., selectable using virtual hand representations of the hand-held controller(s), for indicating task completion. Once a procedural task has been indicated as being completed, the virtual demonstration 50 of the next procedural task, if indeed there is one, may be started by the system. As an alternative to using the hand-held controllers 14 to indicate when a task is completed, the system may be configured to receive voice commands so that the user is able to indicate task completion and readiness for the next procedural task through voice interaction with the system via the microphone.

The system 10 has many advantageous features that facilitate the authoring process and later consumption by a novice user. For example, the system is configured to enable virtual objects, such as tools and parts, to be indicated as being required for a particular task, also referred to herein as tagging or tagged. Tagging is used to establVirtual objects may be tagged as belonging to a particular task by selecting the appropriate command via the virtual control panel, e.g., required object identification, and then contacting the virtual objects with the virtual hand representations. This information is stored in association with the procedural tasks.

When a novice user is viewing the augmented reality demonstration 50 of the task, the system may indicate that the user needs to confirm or verify that the required tools are in the workspace before the demonstration is displayed to the user. The confirmation of the presence of the required objects can be performed by the novice user of the system in any suitable manner. In one embodiment, the system may be configured to determine whether the required tools and parts are in the workspace automatically by activating the object detection and recognition process to identify the objects which are currently in the workspace. Alternatively, the confirmation of the presence of the required tools may be performed by having the user look at the required tools and parts which may then be identified using the object detection and recognition system. Once the system has verified the presence of the required objects, the virtual demonstration of the task may be deployed to the user.

Figure 15:
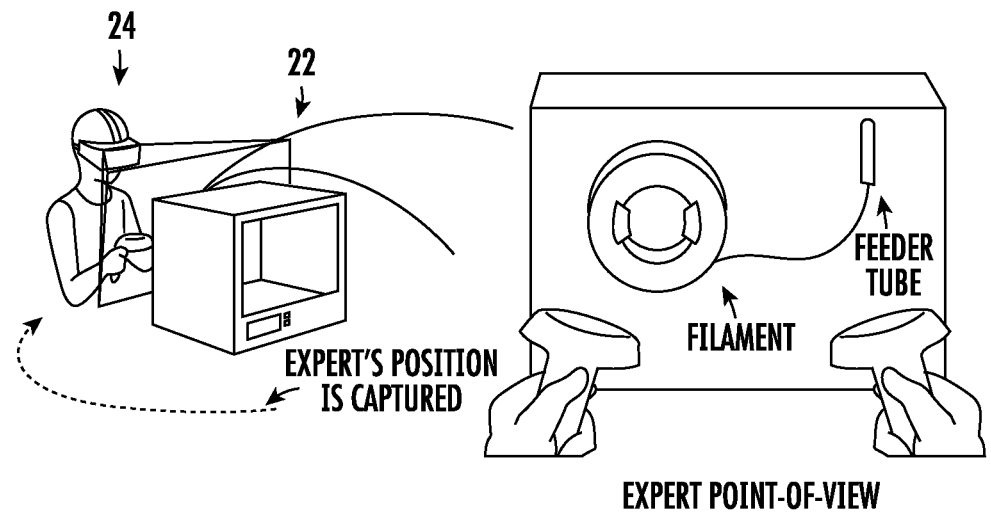
FIGS. 15 and 16 are schematic illustrations for the path of movement indicator which may be rendered on the display of the head mounted AR device of FIG. 1.
Figure 16:
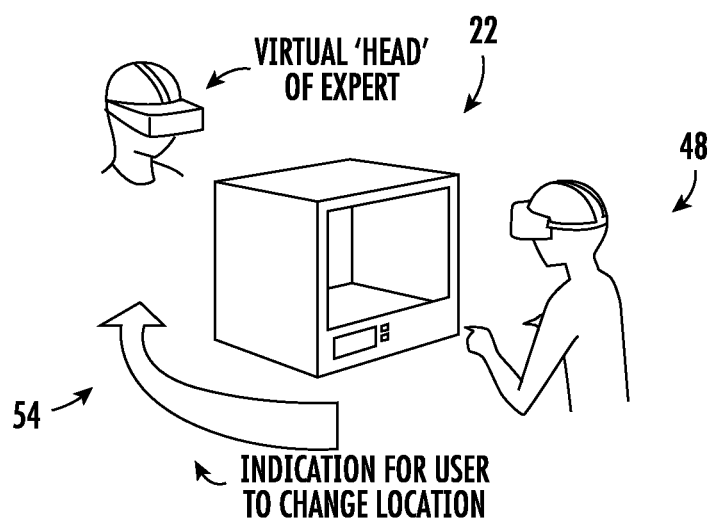

Referring to FIGS. 15 and 16, another advantageous feature is the ability to provide navigation data to the novice user 48. A procedural task is performed in a certain location with respect to the workspace 22 and the objects in the workspace. A subsequent task may require that the user be located at a different location within the workspace. If the user is not familiar with the task or the workspace, it may be difficult for the user to determine where the next.

To ensure that the novice user 48 is in the correct location to view a virtual demonstration of a procedural task, a path of movement indicator 54 may be rendered on the display of the AR device worn by the novice user. The path of movement indicator 54 may be generated during the authoring mode by the authoring user 24. For example, when the authoring user is authoring a demonstration of a procedural task, the authoring user may select via the control panel that a path of movement indicator be generated for a procedural task to indicate where the novice user should go to view the demonstration of the next procedural task. The authoring user may activate the recording of a path of movement indicator at a first position in the workspace, e.g., at which the performance or completion of a first task takes place. The authoring user then moves to a second position at which the start of the next procedural task is to take place. The recording of the path of movement indicator 54 may then be deactivated. The 3D positions within the workspace 22 for the actual path of movement of the authoring user may be detected using sensors 16 (FIG. 1) of the system and stored in association with the appropriate procedural task.

The 3D positions for the path of movement may then be used to render a path of movement indicator 54 in the display of the novice user 48, such as a line or arrow, that follows the path of movement from the first position to the second position. The system may be configured to render the path of movement indicator 54 and then render the virtual demonstration of the procedural task to be performed at the second position only after the novice user is located at the second position. The novice user's position within the workspace may be detected in any suitable manner, such as by using the sensors 16 of the AR system.

Figure 17:
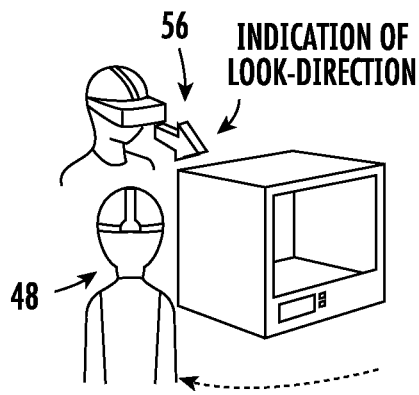
FIGS. 17 and 18 are schematic illustrations for the head position and orientation indicator which may be rendered on the display of the head mounted AR device of FIG. 1.
Figure 18:
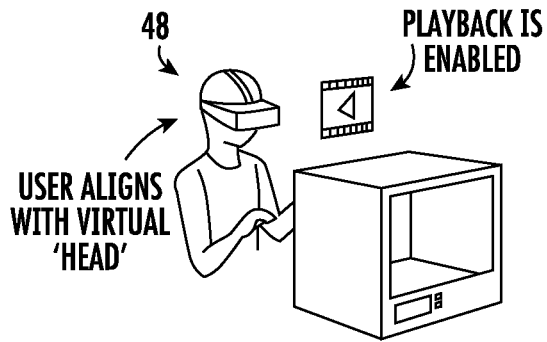

Referring now to FIGS. 17 and 18, when moving to a subsequent procedural task, a novice user may not be located in the right position and/or looking in the right direction to see the virtual demonstration of the procedural task. Therefore, another advantageous feature that may be implemented in the AR system is a head position and orientation indicator 56 that can be used to indicate where the novice user's head should be positioned and how it should be oriented to view the virtual demonstration of a procedural task.

The head position and orientation indicator 56 may be generated during the authoring mode by the authoring user in a similar manner as the path of movement indicator. For example, when the authoring user is authoring a demonstration of a procedural task, the authoring user may select via the control panel that a head position and orientation indicator be generated for a procedural task to indicate where the novice user's head should be positioned and oriented to view the demonstration of the next procedural task. The authoring user may activate the recording of the head position and orientation indicator when the authoring user's is positioned and oriented in the desired manner. The 3D position and orientation of the head mounted AR device may be detected using the sensors 16 of the system and stored in association with the appropriate procedural task.

The 3D position and orientation for the head position and orientation indicator 56 may then be used to render the indicator in the display of the novice user 48. In one embodiment, the head position and orientation indicator 56 comprises a virtual arrow. The head position and orientation indicator may be rendered by taking three points into consideration: an initial point (closest the user's head), a middle point, and a final point (farthest from the user's head) which may be arrow-shaped. The system may be configured to render the head position and orientation indicator prior to the rendering of the subsequent procedural task. Once the novice user has reached a position at which the head position and orientation of the novice user corresponds to the indicator, the virtual demonstration of the procedural task may be started.

Figure 19:
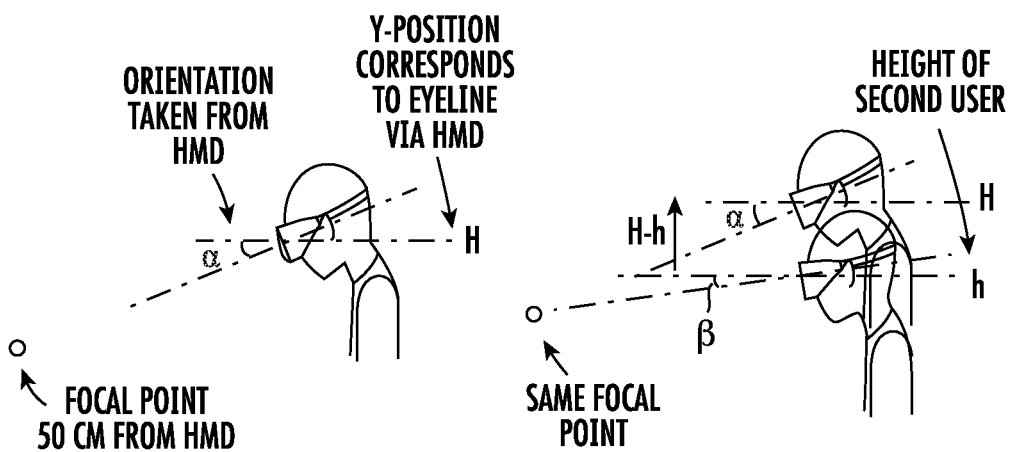
FIG. 19 is a schematic illustration demonstrating how the head position and orientation indicator may be adjusted to compensate for differences in height.

The system may be configured to compensate for differences in height between the authoring user and the novice user in rendering the head position and orientation indicator as depicted in FIG. 19. The difference in height may be detected using the external sensors 16 which track the position and movement of the head mounted AR device. The positions of the points of the arrow may then be adjusted to correspond to the height of the novice user.

Figure 20:
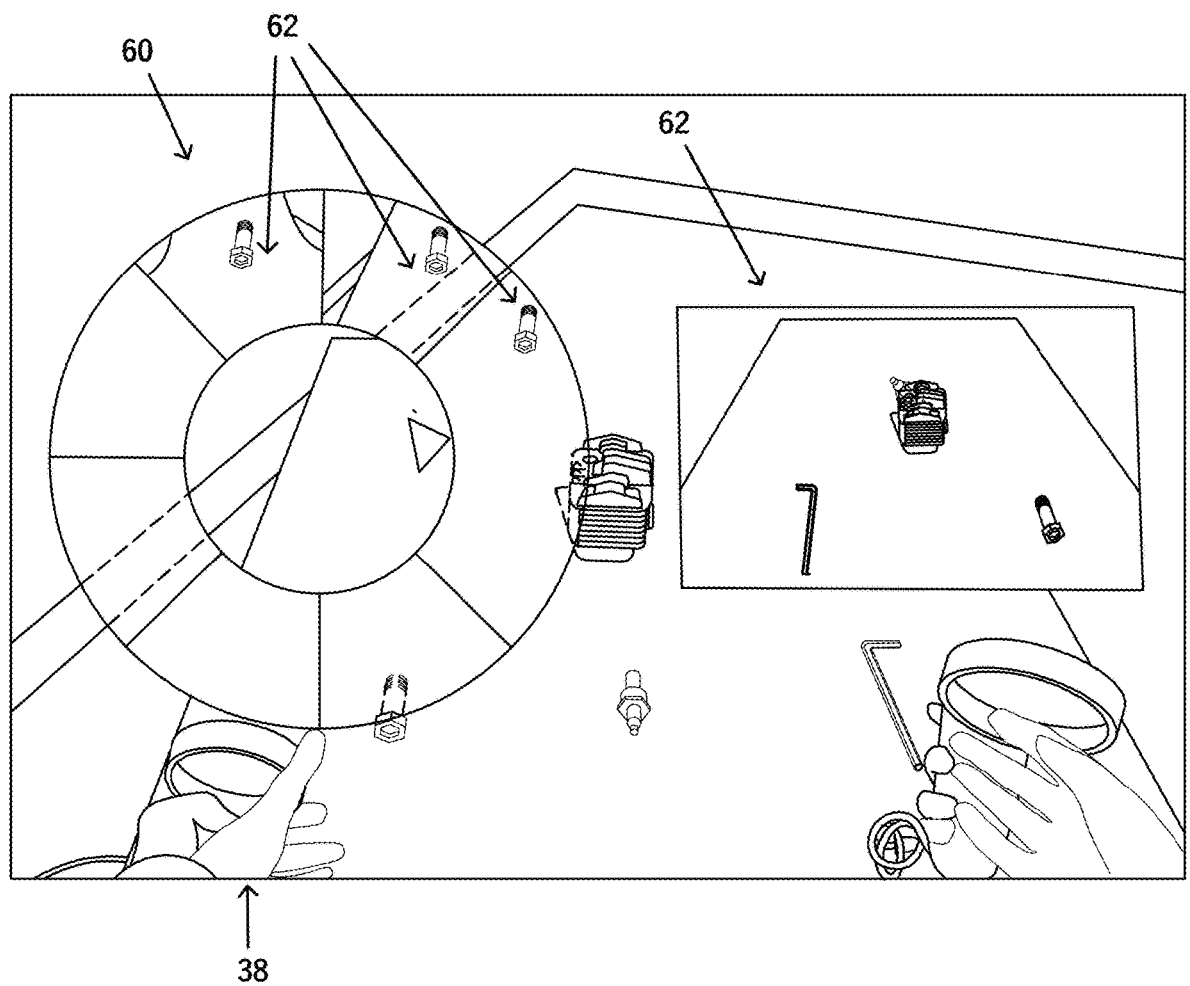
FIG. 20 is an image of the user interface for adding 2D video as AR content to instructions.
Figure 21:
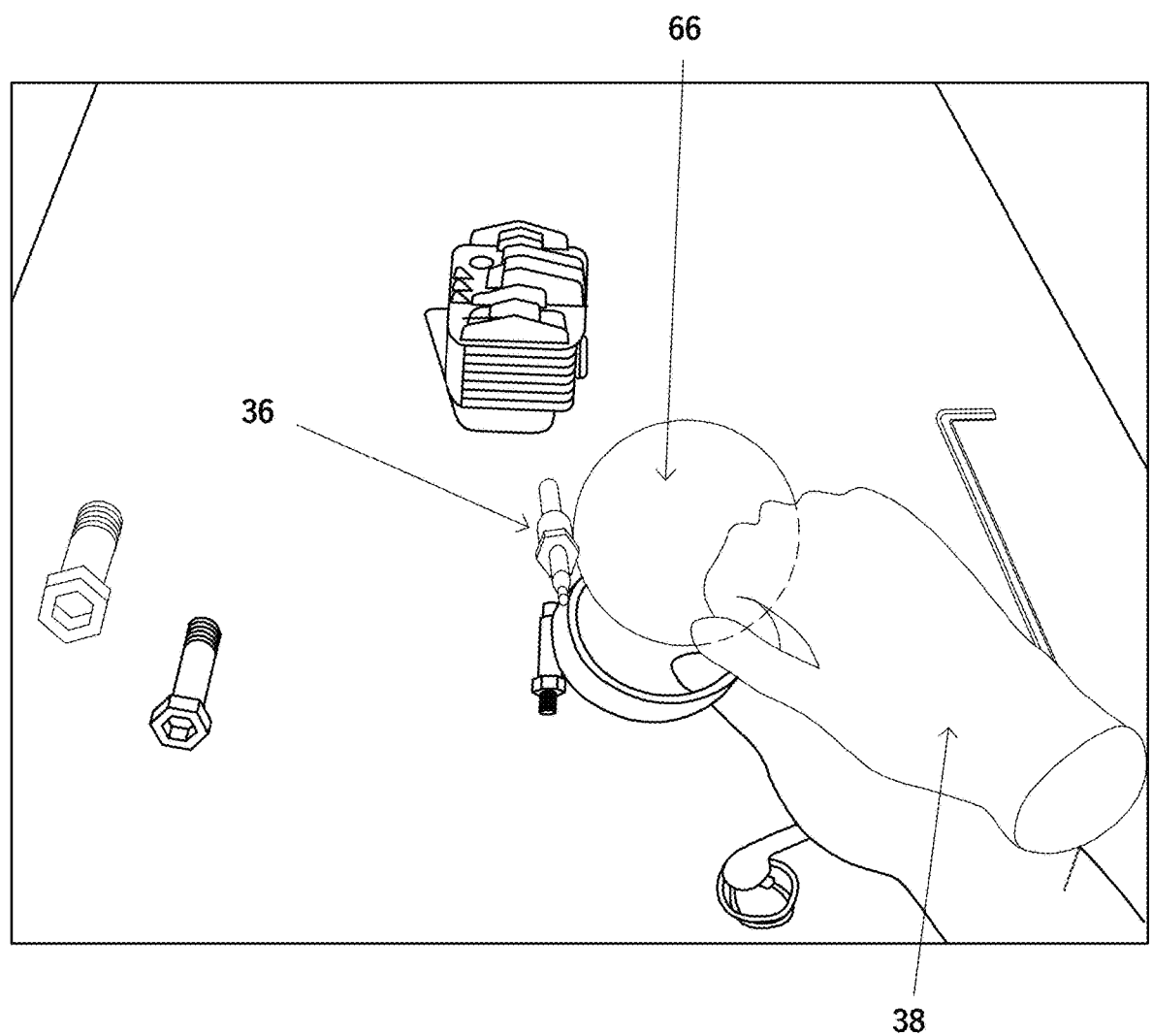
FIG. 21 is an image depicting the tagging of a 2D video to a virtual object which is relevant to the video.

With reference to FIGS. 20 and 21, the AR system also enables the use of video recordings as an alternative or in addition to 3D virtual demonstrations. This allows the user to mix and match 3D animations and 2d video demonstrations as they see fit for the particular task. Video recording may be controlled via a button or actuator on the hand-held controllers 14 or via the virtual control panel 44 (FIG. 9). During recording, the hand-held controllers 14 can be placed to the side as the user only has to directly demonstrate the task with the physical objects and with the user's physical hands. The video is captured from the point of view of the user using the camera 20 on the head mounted AR device. The captured video can then be stored in memory in association the procedural task performed in the video. As an alternative to in situ creation of the 2D videos, the videos can be sourced externally.

For authoring users to author video instructions, the AR system includes a virtual modality to overly the videos in AR. For example, the system may be configured to render a special user interface panel 60 that automatically loads the first color frame of each 2D video created onto a designated panel button 62, thereby associating the buttons on the panel to specific videos 64. In the embodiment of FIG. 20, the panel 60 comprises a radial panel with buttons 62 that can be selected using the virtual hands 38. The user can freely navigate each panel button 62 using the hand-held controllers 14 which prompts a virtual window 64 to appear and preview the video clip. Once a video is chosen, the user can use a video marker 66 (FIG. 21) to tag the selected video to virtual objects 36 that are relevant to the video instruction. The video and tagged items are then stored in association with the task being performed.

The novice user can view the videos previously overlaid by the authoring users to complete the current procedural task in progress. When the novice proceeds to a video instruction, the system may require that the objects tagged to the video be identified and/or confirmed as being present in the workspace. The list of objects are authored by the authoring user as a means of asynchronous task guidance. This functionality ensures that the novice user is aware of the required tools to perform a task prior to taking action. Once the checklist is fulfilled, a virtual screen featuring the corresponding task video is rendered on the screen of the novice user's AR device 12 at the position of one of the required objects for the task. The virtual video screen can be dragged by grasping the virtual screen with the virtual hands and placed where desired with the virtual workspace. The user's gaze may be used to control the playback of the video on the virtual screen. For example, the system may be configured to play the video when the user looks at the virtual screen and stop the video when the user looks away. In one embodiment, the user's gaze in conjunction, with a voice command, e.g., "Play", may be used to control the playback of the video so that the playback of the video is not activated accidentally as the user looks around the workspace.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating an augmented reality (AR) system, the method comprising:
   capturing first images of a first real-world workspace using a camera of a first head mounted AR device of the AR system being worn by a first user;
   processing the first images using a first processor of the AR system to identify physical objects in the first real-world workspace and detect 3D positions of the identified physical objects in a 3D space corresponding to the first real-world workspace;
   generating, based on user inputs from the first user, first augmented reality content displayed with respect to the identified physical objects in the first real-world workspace;
   capturing second images of a second real-world workspace using a camera of a second head mounted augmented reality device being worn by second user;
   processing the second images using a second processor to identify physical objects in the second real-world workspace and detect 3D positions of the identified physical objects in a 3D space corresponding to the first real-world workspace; and
   rendering the first augmented reality content on the display of the second head mounted augmented reality device, first augmented reality content being displayed with respect to identified physical objects in the second real-world workspace that correspond to the physical objects in the first real-world workspace.

2. The method of claim 1, the generating the first augmented reality content further comprising:
   rendering virtual objects representing the identified physical objects on the display of the first head mounted AR device at the respective 3D positions for the identified physical objects;
   manipulating a first one of the virtual objects using at least one hand-held controller of the AR system in a manner that mimics a performance of a first procedural task using the physical object associated with the first one of the virtual objects;
   recording the manipulation of the first one of the virtual objects that mimics the performance of the first procedural task as first augmented reality content; and
   storing the first augmented reality content in a memory of the AR system.

3. The method of claim 2, further comprising:
   manipulating a second one of the virtual objects using the at least one hand-held controller in a manner that mimics a performance of a second procedural task using the identified physical object associated with the second one of the virtual objects;
   recording the manipulation of the second one of the virtual objects that mimics the performance of the second procedural task as second augmented reality content; and
   storing the second augmented reality content in the memory of the AR system.

4. The method of claim 2, further comprising:
   rendering the first augmented reality content when the second processor determines that one of the identified physical objects in the second real-world workspace corresponds to the first one of the identified physical objects in the first real-world workspace.

5. The method of claim 4, further comprising:
   displaying a virtual control panel in a field of view of the second user;
   indicating a completion of the first procedural task via the virtual control panel.

6. The method of claim 3, further comprising:
   displaying second augmented reality content on the display of the second head mounted augmented reality device to demonstrate performance of the second procedural task in response to the indication that the first procedural task is completed.

7. The method of claim 6, further comprising:
   tracking movement of the first user from a first position at which the first procedural task is to be performed to a second position at which the second procedural task is to be performed in the real-world workspace;
   rendering a path of movement indicator in the 3D space that indicates a path of movement of the first user from the first position to the second position;
   storing the path of movement indicator in association with the second augmented reality content.

8. The method of claim 7, further comprising:
rendering the path of movement indicator in the display of the second head mounted AR device before displaying the second augmented reality content; and
rendering the second augmented reality content on the display of the second head mounted augmented reality device when the second user reaches the second position.

9. The method of claim 6, further comprising:
detecting a head position and orientation of the first user at a position at which the second procedural task is to be performed in the real-world workspace;
rendering a head position and orientation indicator in the 3D space that indicates the head position and orientation of the first user at the position; and
storing the head position and orientation indicator in association with the second augmented reality content.

10. The method of claim 9, further comprising:
rendering the head position and orientation indicator in the display of the second head mounted AR device before displaying the second augmented reality content; and
rendering the second augmented reality content on the display of the second head mounted augmented reality device when a head position and orientation of the second user corresponds to the head position and orientation of the first user as indicated by head position and orientation indicator.

11. The method of claim 9, further comprising:
adjusting an angle of the head position and orientation indicator in the display of the second head mounted AR device based on a height of the second user.

12. The method of claim 1, further comprising:
recording a voice of the user using a microphone of the AR system during the recording of the first augmented reality content generation.

13. The method of claim 1, further comprising:
rendering a virtual control panel with selectable items that enable at least one of a preview of the first augmented reality content, deletion of the first augmented reality content, activation of detection of the physical objects, and activation of the display of the virtual objects;
displaying the virtual control panel on the display of the head mounted AR device in a field of view of the user; and
interacting with the virtual control panel using the hand-held controllers.

14. A method of operating an augmented reality (AR) system, the method comprising:
capturing images of a first real-world workspace using a camera of a first head mounted AR device of the AR system being worn by a first user;
processing the images using a first processor of the AR system to identify physical objects in the first real-world workspace and detect 3D positions of the identified physical objects;
rendering virtual objects representing the identified physical objects on the display of the first head mounted AR device worn by the first user, superimposed at the respective 3D positions for the identified physical objects in the first real-world workspace;
manipulating a first one of the virtual objects in the first real-world workspace, based on inputs received from the first user via at least one hand-held controller of the AR system, in a manner that mimics a performance of a first procedural task using the physical object associated with the first one of the virtual objects;
recording the manipulation of the first one of the virtual objects that mimics the performance of the first procedural task as first augmented reality content; and
storing the first augmented reality content in a memory of the AR system.

15. The method of claim 14, further comprising:
manipulating a second one of the virtual objects in the first real-world workspace, based on inputs received from the first user via the at least one hand-held controller, in a manner that mimics a performance of a second procedural task using the identified physical object associated with the second one of the virtual objects;
recording the manipulation of the second one of the virtual objects that mimics the performance of the second procedural task as second augmented reality content;
storing the second augmented reality content in the memory of the AR system.

16. The method of claim 14, further comprising:
capturing images of a second real-world workspace using a camera of a second head mounted augmented reality device being worn by a second user;
processing the images using a second processor to identify physical objects in the second real-world workspace and detect 3D positions of the identified physical objects in a 3D space corresponding to the first real-world workspace; and
rendering the first augmented reality content, on the display of the second head mounted augmented reality device worn by the second user, to demonstrate performance of the first procedural task.

17. The method of claim 16, further comprising:
rendering the first augmented reality content when the second processor determines that one of the identified physical objects in the second real-world workspace corresponds to the first one of the identified physical objects in the first real-world workspace;
displaying, on the display of the second head mounted augmented reality device, a virtual control panel in a field of view of the second user; and
indicating a completion of the first procedural task via the virtual control panel.

18. The method of claim 17, further comprising:
displaying second augmented reality content on the display of the second head mounted augmented reality device to demonstrate performance of a second procedural task in response to the indication that the first procedural task is completed.

19. The method of claim 14, further comprising:
recording a voice of the user using a microphone of the AR system during the recording of the first augmented reality content generation.

20. The method of claim 14, further comprising:
rendering a virtual control panel with selectable items that enable at least one of a preview of the first augmented reality content, deletion of the first augmented reality content, activation of detection of the physical objects, and activation of the display of the virtual objects;
displaying the virtual control panel on the display of the head mounted AR device in a field of view of the user; and
interacting with the virtual control panel using the hand-held controllers.

* * * * *